Patented May 20, 1947

2,420,703

UNITED STATES PATENT OFFICE 2,420,703

2-SULFANILAMIDOPYRAZINE

Rudolph Conrad Ellingson, Evansville, Ind., assignor to Mead Johnson & Company, Evansville, Ind., a corporation of Indiana No Drawing. Application February 5, 1941, Serial No. 377,523

2 Claims. (Cl. 260—239.6)

My invention relates to 2-sulfanilamidopyrazine, a pyrazine derivative related to the class of chemotherapeutic compounds used in the treatment of streptococcal and pneumococcal infections, of which sulfanilamide, p-aminobenzenesulfonamide, is the prototype.

My compound is prepared by reacting 2-aminopyrazine with p-acetaminobenzenesulfonyl chloride followed by deacetylation. The reactions involved may be represented as follows:

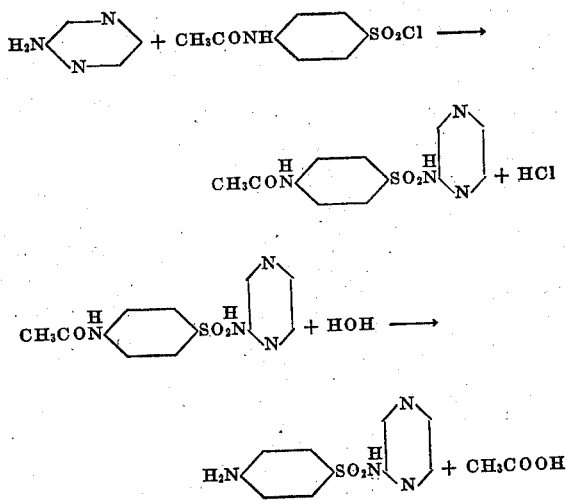

I am aware that other p-acylaminobenzenesulfonyl chlorides, e. g., p-propionylaminobenzenesulfonyl chloride, might be used instead of the simpler p-acetylaminobenzenesulfonyl chloride; the substitution of such obvious chemical equivalents would be within the scope of my invention.

For the preparation of 2-(N⁴-acetylsulfanilamido) pyrazine, I prefer the following procedure: Two and one-tenth parts by weight of 2-aminopyrazine are suspended in 6.4 parts of pyridine. To this suspension 5.5 parts of p-acetaminobenzenesulfonyl chloride are added, with agitation, at such a rate that the temperature of the reaction mixture preferably does not exceed 55° C. The syrupy dark brown reaction mixture is warmed at about 50° C. for 2 hours. After cooling to room temperature, a cold solution of 1 part sodium hydroxide in 5.5 parts of water is added. The reaction mixture is warmed briefly at about 50° C., then diluted with water. The brown solid which separates is collected and dried, and then purified by crystallization from alcohol. The purified compound, 2-(N⁴-acetylsulfanilamido) pyrazine, forms colorless, needle-like crystals which melt with decomposition at from 250° to 252° C. This substance is soluble in acetone, alcohol, and acetic acid, and is only slightly soluble in water.

2-sulfanilamidopyrazine may be obtained from 2-(N⁴-acetylsulfanilamido) pyrazine by hydrolysis with acidified alcohol. To accomplish this hydrolysis, I prefer the following procedure: One part by weight of 2-(N⁴-acetylsulfanilamido) pyrazine is suspended in 15 parts by weight of a solution containing 1 volume of concentrated hydrochloric acid and 4 volumes of 95% alcohol. The reaction mixture is refluxed for about 25 minutes, cooled and diluted with an equal volume of water. The resulting clear brown solution is neutralized with concentrated ammonium hydroxide, whereupon a solid separates. This solid is collected and dried, and then crystallized from a 70% acetic acid solution. This compound, 2-sulfanilamidopyrazine, forms colorless crystals which melt with decomposition at about 255° C., are soluble in acetic acid and ethanol and are slightly soluble in water.

I claim:

1. The sulfa pyrazine of the formula:

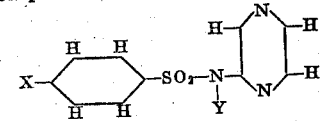

prepared for use as a therapeutic.

2. A compound having the linkage:

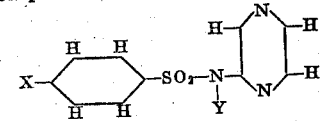

in which X is a group hydrolyzable to —NH₂, and in which Y is a cation prepared for use as a therapeutic.

RUDOLPH CONRAD ELLINGSON.

(References on following page)

REFERENCES CITED

The following references are of record in the file of this patent:

UNITED STATES PATENTS

| Number | Name | Date |
|---|---|---|
| 2,202,933 | Tisze | June 4, 1940 |

FOREIGN PATENTS

| Number | Country | Date |
|---|---|---|
| 512,145 | Great Britain | Aug. 30, 1939 |
| 517,272 | Great Britain | Jan. 25, 1940 |

OTHER REFERENCES

Chem. Reviews, vol. 27, No. 1, Aug. 1940, pp. 99–110.

Journal Amer. Chem. Soc., Jan., 1940, pp. 160–161.

Journal Amer. Chem. Soc., Aug., 1940, pp. 1999–2005.

Journal Amer. Chem. Soc., Aug., 1939, pp. 2032–3, vol. 61.